United States Patent [19]

Westfall et al.

[11] 4,056,646

[45] Nov. 1, 1977

[54] FLOCKED FOAMED LATEX SHEET

[75] Inventors: Paul Marlin Westfall, St. Albans; Howard Mayfield, South Charleston, both of W. Va.

[73] Assignee: Union Carbide Corporation, New York, N.Y.

[21] Appl. No.: 578,092

[22] Filed: May 16, 1975

[51] Int. Cl.$^2$ ............................................. B32B 33/00
[52] U.S. Cl. ...................................... 428/90; 428/95; 428/212; 428/219; 428/247; 428/284; 428/310; 428/315
[58] Field of Search ................... 428/90, 95, 246, 247, 428/252, 262, 265, 272, 284, 286, 212, 219, 310, 311, 315

[56] References Cited

U.S. PATENT DOCUMENTS

| | | | |
|---|---|---|---|
| 3,215,584 | 11/1965 | McConnell | 428/90 |
| 3,607,341 | 9/1971 | Goins | 428/262 |
| 3,637,456 | 1/1972 | Mao | 428/90 |

*Primary Examiner*—Marion E. McCamish
*Attorney, Agent, or Firm*—Francis M. Fazio

[57] ABSTRACT

A soft, pliable, fiber-reinforced surface flock foamed latex sheet comprising a fibrous sheet or scrim base material, a foamed latex and a flocking in which the foam latex comprises up to about 98 weight percent of the foamed latex sheet.

4 Claims, No Drawings

FLOCKED FOAMED LATEX SHEET

BACKGROUND OF THE INVENTION

The concept of producing a sheet material coated with a latex foam on one or both sides has long been known. However, the conventional materials are those in which the fiber or base material comprises the bulk weight of the finished article and the latex is only a small, minor component thereof. Thus, it is known that many drapery fabrics can be produced having these properties; however, in many instances they have considerable weight and bulk and often have limited pliability and a stiff feel or hand. Such compositions are disclosed for example in U.S. Pat. No. 3,607,341, issued Sept. 21, 1971.

There are many applications in which a lighter weight, soft, pliable, breathable, foamed latex sheet whose surface is covered with a flocking material would be desired. In the past, such compositions have not been readily available.

SUMMARY OF THE INVENTION

The instant invention is concerned with a soft, pliable, fiber-reinforced, surface flocked, foamed latex sheet, said foamed latex sheet comprising a woven or nonwoven fibrous sheet or scrim base material weighing from 0.15 to about 5 ounces, preferably from 0.25 to 2 ounces per square yard, adhered to at least one side of said base material a crushed foamed latex, and adhered to the exterior surface of said crushed foamed latex a flocking; wherein the crushed foamed latex comprises from about 25 to about 98 weight percent of the total weight of said foamed latex sheet.

In many instances, particularly when the base material weighs less than about 1.5 ounces per square yard, the fibers thereof are encapsulated by the latex foam.

DESCRIPTION OF THE INVENTION

A soft, cloth-like sheet which is durable to home laundering has been developed. This sheet consists of a woven or non-woven fabric or scrim-reinforced latex foam with the surface of the foam having embedded therein short fibers to give a cloth-like feel. It is also possible to obtain this type of reinforced latex foam sheet by using individual fibers, yarns or monofilaments for the reinforcing material. The foamed latex sheet of our invention find utility as drapery material, table cloths, wall hangings (wall paper), sheets and gowns in hospitals, and many other applications in which similar items are used. The latexes that can be used in producing the foamed latex sheet of this invention are any of the commercially available latex compositions, and include the acrylic latexes, nitrile latexes, styrene butadiene latexes, natural or synthetic rubber latexes, vinyl acetate latexes, vinyl-acrylic latexes, ethylene-vinyl-acrylic latexes, ethylene-vinyl-acetate latexes or any other latex produced from a water insoluble homopolymer or copolymer. These latexes are well known to those skilled in the art and many are commercially available. The preferred latexes are the acrylic latexes.

In producing the foamed latex sheets of this invention the latex, together with conventional additives desired, is foamed using equipment readily available for foaming compositions. This is accomplished by beating air into the latex composition, or some other gas, until a fine, uniform cell structure foam is obtained having the desired foam cell size and body. The volume of the latex composition is increased from about 2 to 20 times its original volume by the foaming or frothing process, preferably from 6 to 10 times its original volume. The latex composition can contain any of the additives conventionally added to foam compositions, such as surfactants, thickeners, foam stabilizers, colorants, fungicides, plasticizers, bactericides, crosslinkers, catalysts or activators, foaming aids, etc. The use of the materials, their identities and the concentrations in which anyone is used are known to those skilled in the art and require no further elaboration in this application. The amounts used are the conventional amounts necessary to impart to the foamed latex the desired properties.

The base material on which the foamed latex sheet is formed comprises a woven or non-woven fibrous sheet or scrim. This base material can be derived from cotton, wool, linen, cellulosic fibers, fiber-glass, polyamide, polyester, polyolefin, rayon, or any other fibrous material, natural or synthetic. It can be in the form of a thin continuous sheet, such as paper tissue, woven, such as cheese cloth, non-woven scrim, or other forms of woven or non-woven articles.

The base material used to produce the foamed latex sheet will vary in weight from 0.15 to 5 ounces per square yard, preferably from 0.25 to 2 ounces per square yard. As the weight per square yard of the base material increases, the stiffness of the foamed latex sheet will similarly increase. In addition, as the apparent denier of the base material fibers increases, the foamed latex sheet will become stiffer, coarser of hand, and exhibit a more pronounced pattern after crushing.

Many flocking materials are known and these are usually produced by chopping or grinding a fibrous material to a short length. Any fibrous material can be used in producing the flocking materials applied to the exterior surface of the foamed latex sheet, including flock obtained from cotton linters, wood pulp, rayon, polyamides, polyacrylics, polyesters, polyacetates, triacetates, polyolefins, glass fibers, wool, asbestos, etc. The flocking materials range in length from 0.001 to 0.1 inch in length. If desired they can be colored or pigmented before application. Flocking materials are readily available in commercial quantities and any such material can be used.

In producing the foamed latex sheets of this invention, the acrylic latex is converted to a foam or froth as previously described and this foam or froth is then applied to the surface of the base material of any conventional means, e.g., knife coater. After application of the foamed latex to the base material, the flocking material is applied to the surface of the foam coated base material and the composite is then dried at an ambient to elevated temperature. The dry composite is then, preferably, passed through crushing rolls and subsequently further heated if desired to complete the drying.

The amount of foamed latex applied to the base material will vary depending upon the ultimate product desired. This amount will be from 0.5 to 8 ounces per square yard, preferably from 1 to 6 ounces per square yard.

The flocking material is present in the final foamed late sheet at a weight of from 0.25 to 4 ounces per square yard, preferably from 0.4 to 1.5 ounces per square yard.

When the base material is in the lower range, less than about 0.5 ounce per square yard, the foamed latex component of the final foamed latex sheet product can be as high as about 90 to 98 weight percent of the sheet.

The drying step is carried out for a period of time and at a temperature sufficient to dry the applied foamed latex. These will vary depending upon the particular foamed latex employed and the amount thereof applied to the base material. The latex foam can be air-dried at ambient temperature conditions. However, drying can be over a period of from about 1 to 5 minutes at from about 225° to 310° F.

If desired, the foamed latex and flock can be applied to both sides of the base material, either simultaneously or in separate steps.

The product, which is the foamed latex sheet of this invention, comprises a base material adhered to or encapsulated in foamed latex present on at least one side of said base material. The foamed latex sheet of this invention has a soft, cloth-like hand and surface feel; it is durable to home laundering, pliable or flexible, breathable, and in some instances dry-cleanable depending upon the particular latex used.

The following examples further serve to illustrate the invention. Parts are by weight unless otherwise indicated.

EXAMPLE 1

A formulation was prepared containing the following components:

| | |
|---|---|
| Water | 28.16 parts |
| Hydroxyethyl celluose (1) | 0.09 parts |
| Acrylic latex (2) | 63.58 parts |
| Poly(ethylene oxide)dioctoate | 5.00 parts |
| Ammonium stearate Surfactant (3) | 8.17 parts |

(1) Viscosity of 4,400 cps from a 2 percent aqueous solution.
(2) Ethyl acrylate/2-ethylhexyl acrylate/N-methylolacrylamide/acrylic acid/acrylonitrile latex having a total solids content of about 57 per cent.
(3) Sulfated $C_{14}-C_{15}$ linear alcohol.

The pH was adjusted to 9.6 with ammonium hydroxide and the Brookfield viscosity of the mixture was 1,170 cps (Model RVT, No. 3 spindle, 20 rpm).

The above formulation was placed in a laboratory mixer and whipped to a froth foam at a ratio of 7 parts of air to 1 part of formulation. The foam was normalized, large bubbles of air stirred out of the mixture, by a final slow stirring. The latex foam was thick and self-supporting.

A sheet of release paper was placed on a glass plate with the release surface exposed. There was placed upon this a light weight spunbonded nylon fabric having a weight of 0.3 ounces per square yard. This was stretched tightly and smoothly and then a 30 mil coating of the froth latex foam was applied to the fabric. The surface of the froth latex foam was immediately sprayed with ground cotton linters having an average length of about 0.008 inch. The entire assembly was dried in a forced air oven at 250° F. for 5 minutes. After drying, the assembly was removed from the oven, cooled and the release paper was peeled off.

The surface from which the release paper was removed was now coated with a 30 mils coating of the frothed latex foam and sprayed with the ground cotton linters. The assembly was dried for 5 minutes in the forced air oven at 250° F., removed and cooled. The fabric was crushed by passing it through squeeze rolls with a pressure of about 60 psi, then mounted on a frame and finally dried for 1.5 minutes at 300° F.

A soft, pliable, fiber-reinforced, surface flocked, foamed latex sheet was obtained which was durable to more than 10 washings in an automatic home laundering washing machine. It has a soft, cloth-like feel and resembled a light weight woven cloth in hand and flexibility. It did not exhibit the harsh, more paper-like feel that is characteristic of most non-woven fabrics, nor did it have the plastic-like hand of latex foam sheets. The durability to laundering was unexpectedly superior than that exhibited by soft, light weight non-woven fabrics.

The final latex sheet consisted of the following, 0.3 ounce per square yard of the spunbonded nylon 0.8 ounce per square yard of the ground cotton linters, and 1.2 ounces per square yard of the frothed latex foam for a total of 2.3 ounces per square yard. Thus, the foamed latex sheets was actually 52 percent by weight of latex foam. The foamed latex sheet had a tensile strength of 9.4 lb./in. (MD) and 4.5 lb./in (CD), elongation of 7.5 percent (MD) and 17 percent CD) and a porosity of 42.3 cubic feet per square foot per minute. The tensile and elongation properties were determined using the approved ASTM test procedures. Porosity was determined by measuring the volume of air passing through a 4 square inch surface area at a pressure drop of 0.5 inch of water.

EXAMPLE 2

The foam formulation described in Example 1 was frothed as described in Example 1.

A light weight, spunbonded nylon fabric having a weight of 0.3 oz. per square yard was stretched tightly between two upraised sides of a pin frame in such a manner as to suspend the major part of the fabric in air (no back-up support). The frothed latex foam was applied to one surface using a knife coater scraping over the surface. This side was immediately flocked in the manner described in Example No. 1. The material was then dried at 250° F. for 5 minutes, removed from the pin frame, placed in a pin frame with a removable glass underlay and a 30 mil coating of the frothed latex foam was applied to the other side using a knife coater. This second side was also flocked as described in Example 1. The material was then dried for 5 minutes at 250° F, crushed using rubber pad rolls at 60 psi pressure and cured for 1.5 minutes at 300° F. This procedure was used to prepare the novel nonwoven foamed latex sheets from several weights of spunbonded nylon fabric.

| Sample No. | Spunbonded Nylon oz./sq.yd. | Foamed Latex Sheet oz./sq.yd. |
|---|---|---|
| 1 | 0.3 | 2.6 |
| 2 | 0.4 | 3.35 |
| 3 | 0.5 | 2.57 |
| 4 | 0.6 | 3.26 |
| 5 | 0.7 | 3.29 |
| 6 | 0.85 | 2.80 |
| 7 | 1.0 | 3.49 |
| 8 | 1.5 | 3.79 |
| 9 | 2.0 | 4.94 |

The foamed latex sheets became increasingly stiffer and less flexible as the spunbonded fabric weight increased.

EXAMPLE 3

Using the frothed latex foam system and application methods described in Example 1. Samples were prepared using both woven and non-woven scrims made of polyester polypropylene, cotton and fiberglass.

All of the resulting foamed latex sheets produced were soft and pliable and exhibited properties similar to a typical woven fabric rather than those of a typical nonwoven material of equal weight.

EXAMPLE 4

A formulation was prepared as described in Example 1 containing the following components:

| | |
|---|---|
| Water | 34.45 parts |
| Rutile Titanium Dioxide/Aluminum Silicate Clay, 65% Slurry (1) | 130.50 parts |
| Dimethyl Silicone Oil, 20 cstks. | 0.01 parts |
| Hexamethoxymelamine | 4.00 parts |
| Disodium N-Octadecylsulfosuccinamate | 2.85 parts |
| Ammonium Stearate, 20% Dispersion in Water | 35.00 parts |
| Ammonium Hydroxide, 28% Ammonia | 5.00 parts |
| Aluminum Acetate, 20% Aqueous | 3.00 parts |
| Acrylic Latex (2) | 188.68 parts |
| p-Toluene Sulfonic Acid, 20% Aqueous | 2.50 parts |
| Sulfated Linear Alcohol | 0.90 parts |
| Hydroxyethyl Cellulose | 4.15 parts |
| Total Solids, % | 49 |
| pH | 9.8 |
| Brookfield Viscosity, Model LVF, No. 3 Spindle, 12 rpm, cps. | 500 |

| (1) | Pigment Slurry Composition | Parts by Weight |
|---|---|---|
| | Rutile Titanium Dioxide | 26.0 |
| | Aluminum Silicate Clay | 39.0 |
| | Tetrapotassium Pyrophosphate | 0.4 |
| | Water | 34.6 |
| | Total | 100.0 |
| (2) | Ethylacrylate/acrylonitrile/acrylic acid/itaconic acid/N-methylol acrylamide latex having a total solids content of about 50 per cent. | |

The above formulation was frothed as described in Example 1 and novel nonwoven foamed latex sheets were prepared in the same manner as therein described using 0.3 ounce per square yard spunbonded nylon. The following structures were prepared:

| Sample Number | Foam Applications of 30 mils Each | Type of Flock | Final Structure Weight oz/sq.yd. |
|---|---|---|---|
| 1 | 1 side | none | 1.1 |
| 2 | 2 side | none | 1.5 |
| 3 | 1 side | cotton | 1.5 |
| 4 | 2 side | cotton | 2.4 |
| 5 | 1 side | bleached wood pulp | 1.5 |
| 6 | 2 side | bleached wood pulp | 2.2 |

Control Samples 1 & 2 were soft and pliable but exhibited a plastic like hand. The foamed latex sheets of this invention, Samples 3 & 4, were very soft and pliable and exhibited a soft cloth-like hand. Samples 5 & 6 were soft and pliable but exhibit a somewhat harsher hand than that exhibited by Samples 3 & 4; however, this was expected since the flock used was wood pulp flock.

EXAMPLE 5

A formulation was prepared as described in Example 1 containing the following components and adjusted to a pH of 9.6 with ammonium hydroxide.

Example 6

| | |
|---|---|
| Water | 28.16 parts |
| Hydroxyethyl Cellulose | 4.50 parts |
| Acrylic latex (1) | 63.58 parts |
| Poly(ethylene oxide) Dioctoate | 5.00 parts |
| Ammonium Stearate, 20% Aqueous Dispersion | 8.67 parts |
| Sulfated Linear Alcohol | 0.50 parts |

(1) Butyl acrylate/vinyl acetate/N-methylol acrylamide/acrylic acid latex having a total solids content of about 45 percent.

The above formulation was placed in a laboratory mixer and whipped to a froth foam at a ratio of 7 parts of air to 1 part of formulation. The foam was normalized, large bubbles of air stirred out of the mixture, by a final three minute period of slow stirring. The latex foam was thick and self-supporting.

Using a coating board equipped with a row of pins on each of the four sides of a teflon coating surface, a sheet of spunbonded nylon fabric having a weight of 0.3 ounces per square yard was thoroughly wet with water and stretched across the teflon surface and hooked over the pin in all four directions. This procedure eliminated wrinkling after the coating was applied and resulted in a smoother appearing foamed latex sheet. The base fabric was allowed to dry and then a 30 mil coating of the frothed latex was applied to the fabric. The surface of the frothed latex foam was immediately sprayed with ground cotton flock having an average length of about 0.008 inch. The entire assembly was then allowed to air-dry for four hours. The fabric was then removed from the supporting coating board and the reverse side was similarly coated with a 30 mil coating of the frothed latex foam and sprayed with cotton linters. The fabric was then dried, cured for five minutes in a forced air oven at 250° F. and then crushed between rubber pad rolls at 50 pli pressure.

The resulting foamed latex sheet was very soft and pliable and exhibited a weight of 2.76 oz/sq.yd. This sheet had much better drape characteristics that those normally found in coated bonded nonwovens of this weight class produced in the past.

EXAMPLE 7

A formulation was prepared as described in Example 1 containing the following components and adjusted to a pH of 9.6 with ammonium hydroxide.

| | |
|---|---|
| Water | 28.16 parts |
| Hydroxyethyl Cellulose | 4.50 parts |
| Poly(vinyl acetate) Latex (1) | 63.58 parts |
| Poly(ethylene oxide) Dioctoate | 5.00 parts |
| Ammonium Stearate, 20% Dispersion in Water | 8.67 parts |
| Sulfated Linear Alcohol | 0.50 parts |

(1) Total solids of about 60 per cent.

A foamed latex sheet was prepared using this formulation by the same procedures described in Example 6.

The resulting sheet was soft and pliable, having a weight of 4.07 oz./sq. yd.

All of the foamed latex sheets produced in the above examples were pliable, soft, of good hand and breathable.

What is claimed is:

1. A soft, pliable, fiber reinforced, surface flocked, foamed latex sheet, said foamed latex sheet comprising a fibrous sheet or scrim base material weighing from 0.15 to 5 ounces per square yard, on at least one side of said base material a foamed latex, and on the exterior surface of said foamed latex a flock; wherein the foamed latex comprises from about 0.5 to about 8 ounces per square yard and the flock comprises from about 0.25 to 4 ounces per square yard.

2. A foamed latex sheet as claimed in claim 1, wherein the foamed latex has been crushed.

3. A foamed latex sheet as claimed in claim 1, wherein the base material weighs from 0.25 to 2 ounces per square yard, its foamed latex weighs from 1 to 6 ounces per square yard and the flock weighs from 0.4 to 1.5 ounces per square yard.

4. A foamed latex as claimed in claim 1, wherein the foamed latex is an acrylic latex.

* * * * *